(12) United States Patent
Armangau et al.

(10) Patent No.: US 10,585,855 B1
(45) Date of Patent: Mar. 10, 2020

(54) OPTIMIZING FILE SYSTEM LAYOUT FOR REDUCED RAID PROCESSING

(71) Applicant: EMC IP Holding Company LLC, Hopkinton, MA (US)

(72) Inventors: Philippe Armangau, Acton, MA (US); Jean-Pierre Bono, Westborough, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 1107 days.

(21) Appl. No.: 14/980,928

(22) Filed: Dec. 28, 2015

(51) Int. Cl.
*G06F 17/30* (2006.01)
*G06F 16/16* (2019.01)
*G06F 16/18* (2019.01)

(52) U.S. Cl.
CPC ............ *G06F 16/164* (2019.01); *G06F 16/18* (2019.01)

(58) Field of Classification Search
CPC .................................................. G06F 2201/84
USPC .......................................... 707/644; 711/162
See application file for complete search history.

(56) References Cited

U.S. PATENT DOCUMENTS

| 9,612,754 | B1 | 4/2017 | Delgado et al. | |
|---|---|---|---|---|
| 9,804,939 | B1 | 10/2017 | Bono et al. | |
| 9,805,044 | B1 | 10/2017 | Armangau et al. | |
| 9,959,058 | B1 | 5/2018 | O'Brien et al. | |
| 9,965,201 | B1 | 5/2018 | Bono et al. | |
| 2007/0094465 | A1* | 4/2007 | Sharma | G06F 11/2064 711/162 |
| 2007/0094466 | A1* | 4/2007 | Sharma | G06F 3/0605 711/162 |
| 2009/0228651 | A1* | 9/2009 | Sharma | G06F 11/2064 711/114 |
| 2009/0259816 | A1* | 10/2009 | Sharma | G06F 11/2064 711/162 |
| 2009/0259817 | A1* | 10/2009 | Sharma | G06F 11/2064 711/162 |

* cited by examiner

*Primary Examiner* — Baoquoc N To
(74) *Attorney, Agent, or Firm* — BainwoodHuang (57) ABSTRACT

A technique for managing a file system includes arranging a first set of multiple metadata elements at a first set of block locations and arranging a second set of multiple metadata elements at a second set of block locations. Each of the first set of metadata elements is related to a respective one of the second set of metadata elements to form a respective pair of metadata elements that the file system is configured to update together. The technique further includes backing the first set of block locations and the second set of block locations together on a single RAID stripe, such that updating each pair of metadata elements is achieved using a single stripe write.

20 Claims, 7 Drawing Sheets

OPTIMIZING FILE SYSTEM LAYOUT FOR REDUCED RAID PROCESSING

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Data storage systems commonly arrange file-based data in file systems. Such file systems include both data and metadata. The metadata organizes the file data on disk structures, such that each file's data can be located, placed in proper sequence, and kept separate from other files' data. Known types of file system metadata include, for example, inodes, indirect blocks (IBs), per-block metadata (BMD), and virtual block maps (VBM). Data and metadata of a file system may be stored in blocks, where a "block" is the smallest unit of allocatable storage in the file system. Non-limiting example sizes of blocks are 4 KB, 8 KB, and/or 32 KB, for example.

As is known, inodes store information about files and may include pointers to IBs. IBs include pointers that point either to other IBs or to data blocks. IBs may be arranged in multiple layers, forming an IB tree, with the leaves of the tree pointing to data blocks. In some implementations, virtual block maps (VBMs) are placed between leaf IB pointers and respective data blocks to provide data block virtualization. VBMs are small metadata structures, such that many VBMs may be stored per block (i.e., in a "VBM block"). IBs, VBM blocks, and data blocks may each have associated BMD. BMDs store block-specific information, which may include a checksum or CRC (cyclic redundancy check) of the contents of the block to which it refers. Many BMDs may be stored in a single block (i.e., in a "BMD block").

SUMMARY

Certain file system operations, such as data writes, copies, moves, and the like, effect changes to multiple metadata structures at once. For example, a data write to a file may cause a new block pointer to be created in an IB supporting storage of that file. But changing the IB for the file necessitates changing the BMD for the IB, in order that the CRC within the BMD reflects the IB's changed contents. The file system may cache the new IB and the BMD block that contains the updated BMD, but eventually the file system may be required to flush these blocks to disk.

Unfortunately, flushing updated metadata structures to disk can be a resource-intensive process. For example, the IB to be written may reside on one RAID (Redundant Array of Independent/Inexpensive Disks) stripe of underlying disk storage, while the BMD block may reside on another. For RAID configurations that support parity (e.g., for RAID 5 and/or RAID 6), new parity must be computed and written each time any contents in a RAID stripe are changed. Thus, even a small change to a single block pointer in an IB may result in the need to write to two different RAID stripes, which necessitates processing parity for both RAID stripes to be written. In a file system processing many file operations, such as in an enterprise or cloud-based environment, such multiplication of activity can significantly limit storage performance.

In contrast with prior schemes, an improved technique for managing a file system arranges multiple related metadata structures, whose values tend to change together, at file system locations that map to a single RAID stripe of underlying storage. By coalescing related metadata changes into a single RAID stripe, the improved technique reduces the number of parity operations that need to be performed. Reducing the numbers of parity operations reduces the number of disk accesses and allows disk resources to be used more productively. In addition, reducing the number of parity operations promotes more productive use of processing resources. The improved technique therefore improves the overall functioning of data storage systems.

The improved technique hereof is not limited to IBs and their BMDs but rather applies to any metadata structures that tend to change together in response to file system operations. Other examples may include VBMs and their BMDs, as well as any metadata structures that are duplicated on disk for improved resiliency, such as inodes, for example. It should be understood that "disk" as used herein refers to any non-volatile storage medium that may be arranged in RAID groups, and includes not only conventional magnetic and optical disks, but also flash drives, solid state drives, and the like.

Certain embodiments are directed to a method of managing a file system in a data storage system. The method includes arranging a first set of multiple metadata elements at a first set of block locations in an address space of the file system, and arranging a second set of multiple metadata elements at a second set of block locations in the address space of the file system. Each of the first set of metadata elements is related to a respective one of the second set of metadata elements to form a respective pair of metadata elements that the file system is configured to update together. The method further includes backing the first set of block locations and the second set of block locations together on a single RAID (Redundant Array of Independent/Inexpensive Disks) stripe, such that updating each pair of metadata elements is achieved using a single stripe write.

Other embodiments are directed to a data storage system constructed and arranged to perform a method of managing a file system, such as the method described above. Still other embodiments are directed to a computer program product. The computer program product stores instructions which, when executed on control circuitry of a data storage system, cause the data storage system to perform a method of managing a file system such as the method described above. Some embodiments involve activity that is performed at a single location, while other embodiments involve activity that is distributed over a computerized environment (e.g., over a network).

It should be understood that this summary is provided to familiarize the reader with features of disclosed embodiments and is not intended to define the invention hereof or to be limiting.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing a file system arranges multiple related metadata structures, whose values tend to change together, at file system locations that map to a single RAID stripe of underlying storage. By coalescing related metadata changes into a single RAID stripe, the improved technique reduces the number of parity operations that need to be performed and thereby promotes data storage system efficiency.

Figure 1:
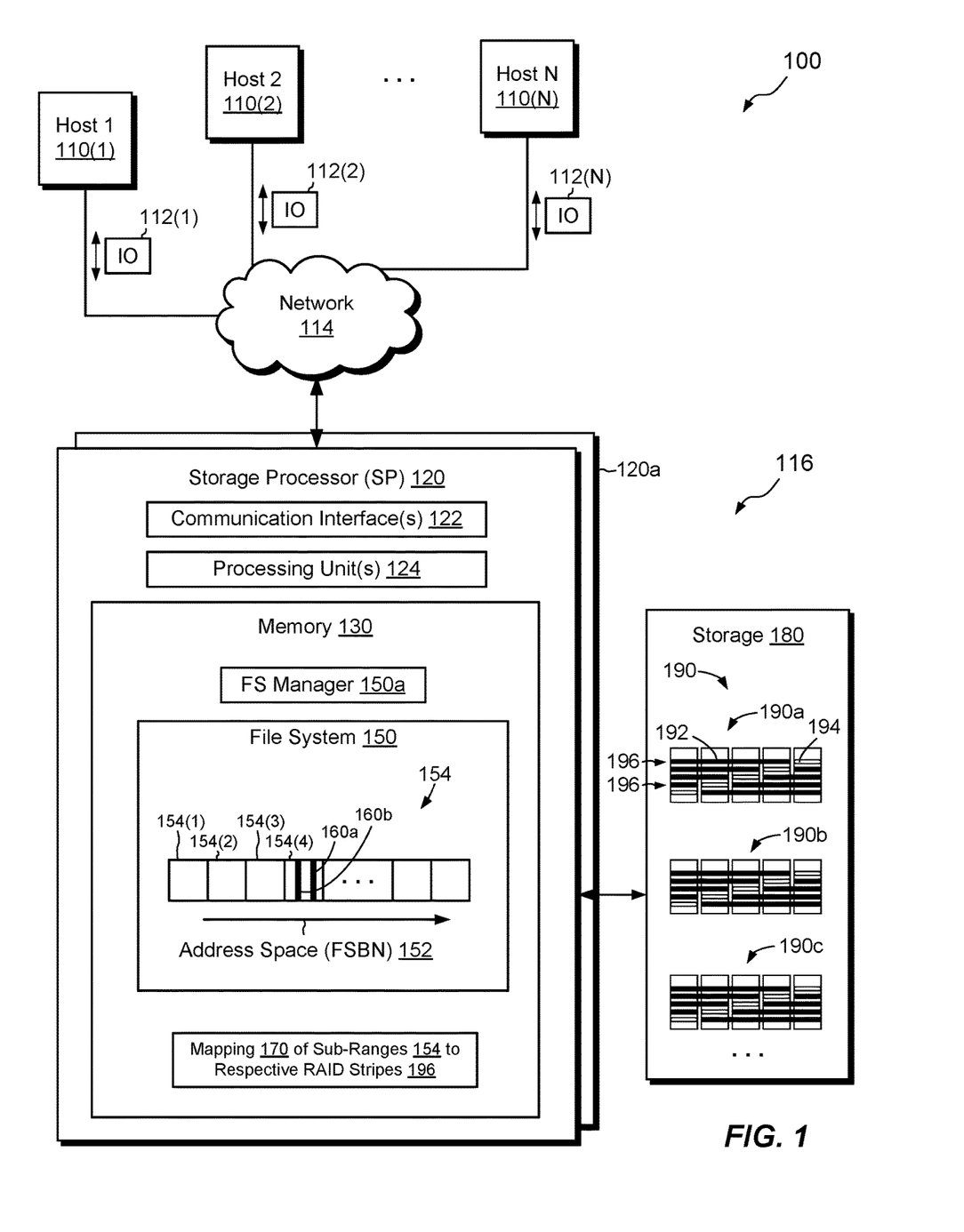
FIG. 1 is a block diagram of an example environment in which an improved technique hereof for managing a file system can be practiced.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The data storage system 116 may include multiple SPs like the SP 120 (e.g., a second SP, 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IOs.

In an example, the storage 180 takes the form of RAID groups 190a, 190b, and 190c (collectively, 190), where each RAID group is composed of multiple disk drives. The disk drives may include magnetic disk drives, electronic flash drives, optical drives, and/or other types of drives. In a typical example, each of the RAID groups 190 includes disk drives of a common type that provide similar performance. Here, each of the RAID groups 190 includes five disk drives. Five stripes are shown in each RAID group; however, it is understood that each RAID group may include any number of stripes, such as hundreds or thousands or more stripes. Each stripe 196 is shown as a horizontal band across all of the disk drives of a RAID group. In the example shown, each stripe 196 includes four data segments 192, one from each of four drives, and a single parity segment 194 from a fifth drive. Segments may be of any suitable size, such as 64 KB, for example, such that each stripe has a length of 256 KB (parity is generally not counted when measuring stripe length). It should be understood that the RAID groups 190 may include different numbers of disk drives per group, different numbers and/or sizes of data and/or parity segments, and/or different numbers of stripes. Any number of RAID groups may be provided, including a single RAID group. The example shown is thus intended to be merely illustrative.

The network 114 may be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes a file system 150, a file system manager 150a, and mapping 170. The file system manager 150a manages activities involving the file system, such as performing reads, writes, copies, deletes, and the like. The file system 150 itself is implemented with an arrangement of blocks, which are organized in an address space 152. Each of the blocks has a location in the address space 152, identified by FSBN (file system block number). For example, FSBN may range from zero to some large number, with each value of FSBN identifying a respective block. In an example, a block is the smallest unit of storage that the file system 150 can allocate. Blocks size may vary based on file system design, with a common block size being 8 KB. Blocks may be any suitable size, however.

As further shown in FIG. 1, the address space 152 of the file system 150 may include sub-ranges 154. Sub-ranges 154(1), 154(2), 154(3), and 154(4) are specifically identified, with others being shown. In one example, the address space 152 is divided into sub-ranges 154, such that each block in the address space 152 belongs to a sub-range. In another example, sub-ranges 154 are provided at locations within the address space 152 but do not span the entire address space 152. In an example, the sub-ranges 154 are sized to correspond to the size of full stripes 196 in the RAID group(s) 190 that back the file system 150. To offer a non-limiting example, if stripes 196 of the RAID groups 190 are each 256 KB (excluding parity), then the size of each sub-range is also 256 KB. If one assumes that each block is 8 KB, then each sub-range 154 would include 32 blocks (256 KB/8 KB=32). Given the potentially large size of the file system 150, it should be evident that the illustration in FIG. 1 is not intended to be to scale.

The mapping 170 establishes correspondences between sub-ranges 154 in the file system 150 and respective stripes 196 in the RAID groups 190. Thus, for example, the mapping 170 associates each sub-range 154 in the file system 150 with a respective stripe 196. Accessing a block within a sub-range 154 causes the data storage system 116 to access a physical location on a storage device (e.g., disk drive) in a RAID group 190.

In example operation, the hosts 110(1-N) issue IO requests 112(1-N) to the data storage system 116. The SP 120 receives the IO requests 112(1-N) at the communication interfaces 122 and initiates further processing. Such further processing may involve making changes to files in the file system 150, which changes cause the file system manager 150a to update file system metadata.

For example, the file system manager 150a may update a first metadata element in a first block 160a. The first metadata element may be an IB (indirect block), a VBM block (virtual block map block), or an inode block, for example. To maintain consistency and/or resiliency, the file system manager 150a may also update a second metadata element in a second block 160b. For instance, the second metadata element may store a CRC or a duplicate of the first block 160a in the second block 160b.

In accordance with improvements hereof, both blocks 160a and 160b are arranged together in the same sub-range 154, such that the mapping 170 maps both blocks to a single stripe 196 in a RAID group 190. Thus, related blocks of file system metadata that change together during file system operations are grouped together in the same sub-range 154, such that they are stored together in the same stripe 196 of physical storage.

Advantageously, the above-described arrangement reduces disk traffic and processing overhead as compared with conventional techniques. For example, by coalescing related metadata changes in a single stripe, the improved technique can effect writes of multiple related metadata blocks by performing a single parity update instead of having to perform multiple parity updates.

Figure 2:
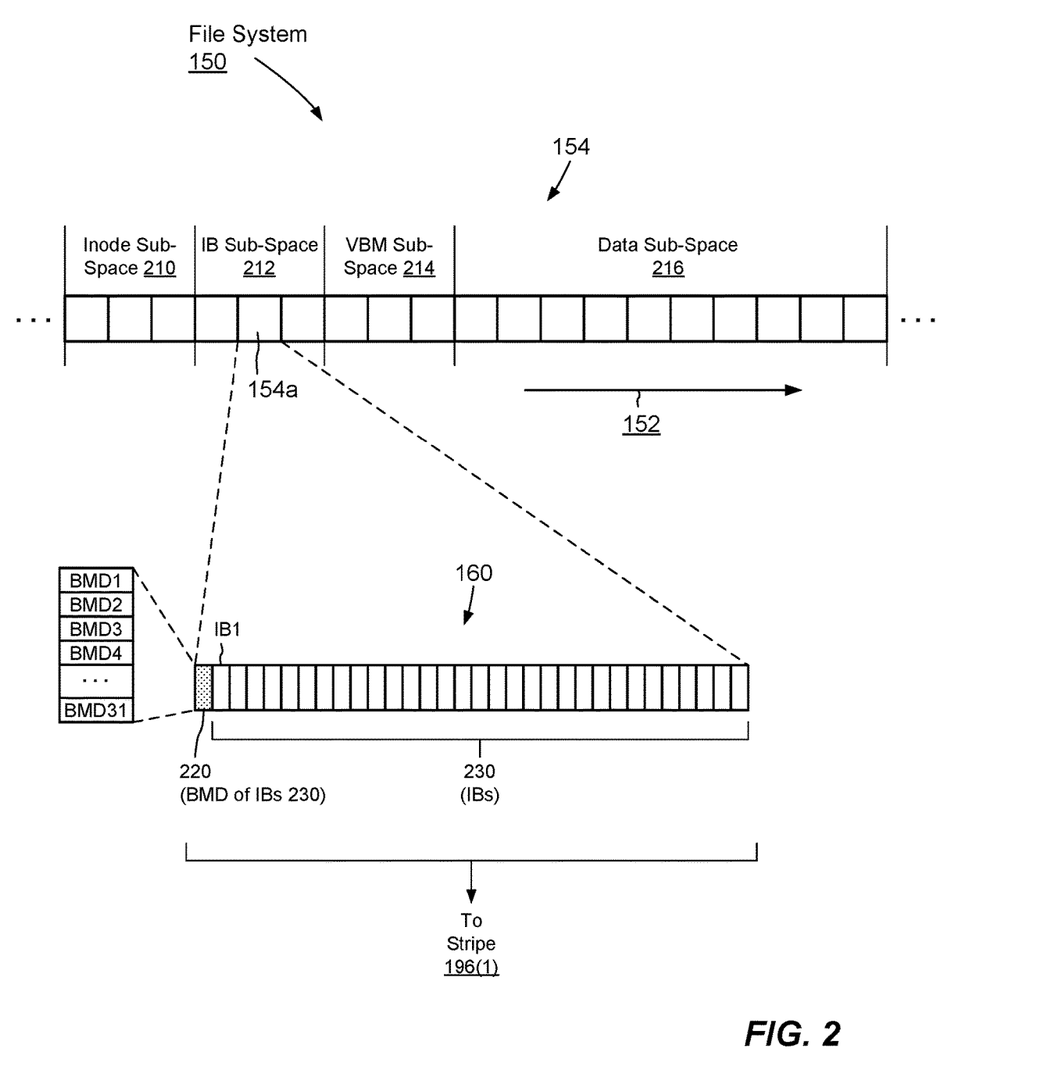
FIGS. 2-4 are block diagrams of an example layout of the file system of FIG. 1.

FIG. 2 shows example features of the file system 150 in greater detail. Here, it can be seen that the file system address space 152 includes multiple sub-spaces. Four such sub-spaces are shown, including an inode sub-space 210, an IB sub-space 212, a VBM sub-space 214, and a data sub-space 216. Each of these sub-spaces is dedicated to a specific type of metadata or to data (e.g., file data). For example, the inode sub-space 210 is dedicated to inodes, the IB sub-space 212 is dedicated to IBs, the VBM sub-space 214 is dedicated to VBM, and the data sub-space 216 is dedicated to data. Each of the sub-spaces 210, 212, 214, and 216 includes one or more sub-ranges 154 (FIG. 1), and each sub-range 154 includes multiple blocks.

As shown in the expanded view near the bottom of FIG. 2, a sub-range 154a in the IB sub-space 212 includes multiple blocks 160 (32 blocks in this non-limiting example). A first set of block locations 230 (e.g., 31 block locations) is provided for IBs, and a second set of block locations 220 (e.g., a single location) is provided for BMD (per-block metadata). The BMD at location 220 describes the IBs at the first set of block locations 230. In an example, the BMD of each IB includes a CRC of the contents of that IB, as well as other metadata. As shown to the left, the single block at location 220 includes BMD for all IBs at locations 230 (i.e., BMD1 to BMD31).

In example operation, the file system manager 150a processes a request to update a block pointer in an IB, such as IB1, which may include many block pointers. The file system manager 150a updates the block pointer in IB1 and computes a new CRC for IB1. The file system manager 150a then stores the newly computed CRC in the BMD for IB1, i.e., in BMD1. In this example, IB1 and the BMD for IB1 (BMD1) represent a pair of related metadata elements. Other block pointers and corresponding BMD may form other pairs. As both blocks IB1 and the block storing the BMD are in the same sub-range 154a, both are mapped to a single stripe 196(1) in the RAID groups 190 and both may be updated together with a single set of parity operations.

Figure 3:
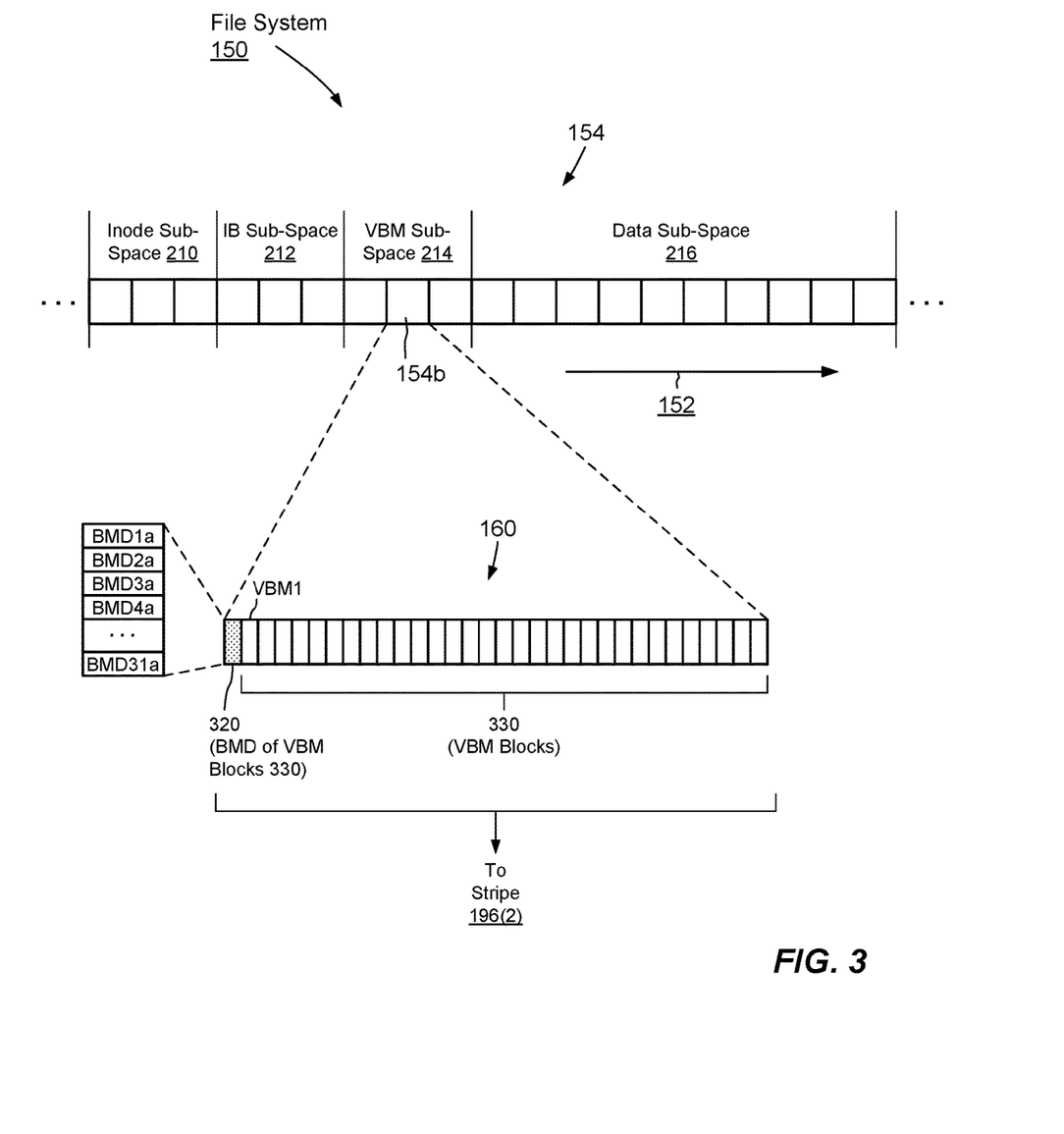

FIG. 3 shows further example features of the file system 150 in greater detail. Here, a sub-range 154b in the VBM sub-space 214 includes multiple blocks 160 (e.g., 32 blocks). A first set of block locations 330 (e.g., 31 locations) is provided for VBM blocks and a second set of block locations 320 (e.g., a single location) is provided for BMD (per-block metadata) of the VBM blocks at locations 330. In an example, the BMD of each VBM block includes a CRC of the contents of that VBM block, as well as other metadata. As shown to the left, the single block at location 320 includes BMD for all VBM blocks at locations 330 (i.e., BMD1a to BMD31a).

In example operation, the file system manager 150a processes a request to update a VBM in a VBM block, such as VBM1, which may include many VBMs. The file system manager 150a updates the VBM in VBM1 and computes a new CRC for VBM1. The file system manager 150a then stores the newly computed CRC in the BMD for VBM1, i.e., in BMD1a. In this example, VBM1 and the BMD for VBM1 (BMD1a) represent a pair of related metadata elements. Other VBMs and corresponding BMD may form other pairs. As both blocks VBM1 and the block storing the BMD are located in the same sub-range 154b, both are mapped to a single stripe 196(2) in the RAID groups 190 and both may be updated together with a single set of parity operations.

Figure 4:
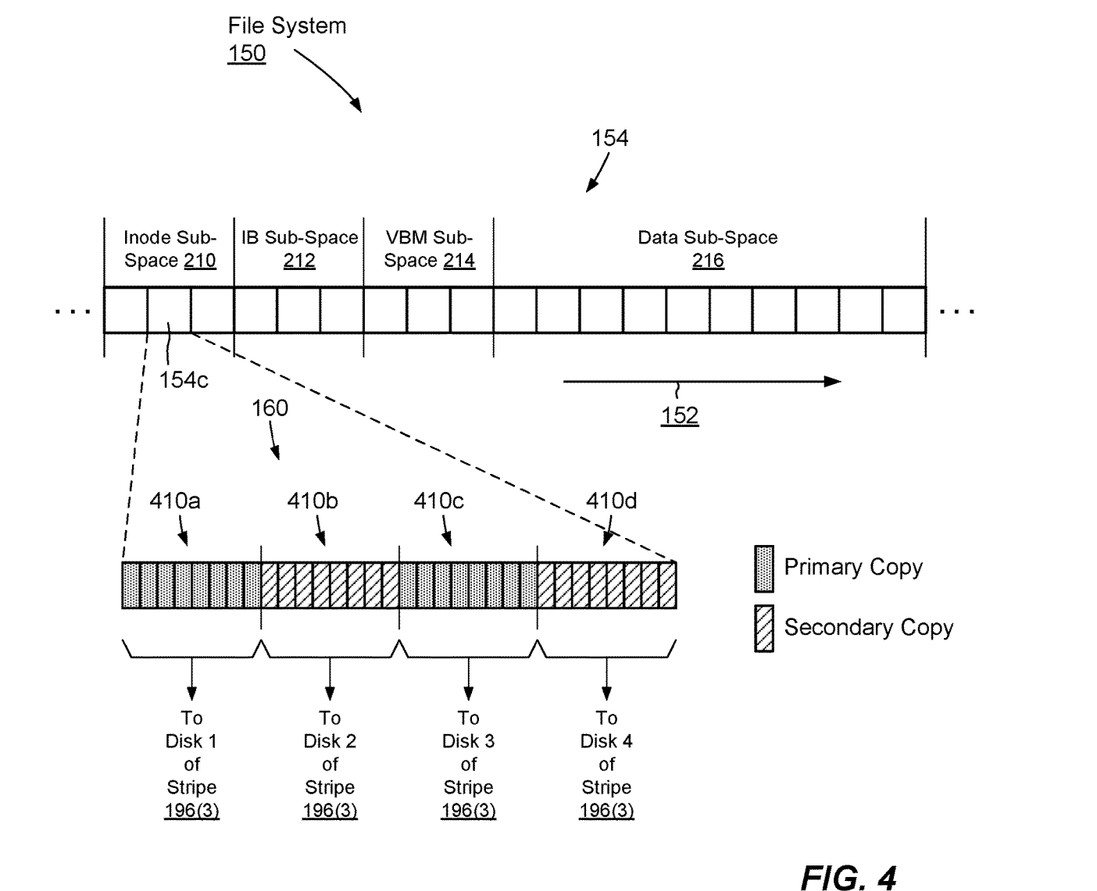

FIG. 4 shows yet further example features of the file system 150 in greater detail. Here, a sub-range 154c in the inode sub-space 210 includes multiple blocks 160 (e.g., 32 blocks). In the example shown, the blocks 160 are organized according to the storage device (e.g., disk drive) to which they are mapped. Thus, for example, a first group 410a of block locations is mapped to a first storage device (Disk 1), a second group 410b of block locations is mapped to a second storage device (Disk 2), a third group 410c of block locations is mapped to a third storage device (Disk 3), and a fourth group 410d of block locations is mapped to a fourth storage device (Disk 4). Each of groups 410a to 410d is thus mapped to a respective storage device; however, all of the groups 410a to 410d are mapped to the same stripe 196(3).

In this example, inodes are duplicated for resiliency, such that the file system 150 stores both a primary copy and a secondary copy of each inode. The file system manager 150a ensures that any changes made to an inode are effected both in the primary copy and in the secondary copy. Multiple inodes may be provided per block. The inodes are arranged such that both the primary copy and the secondary copy of each inode are within the same sub-range 154c but such that each of them is backed by a different disk drive. Thus, inodes arranged in the sub-range 154c are accessible even if a single disk drive fails, regardless of any additional redundancy provided by the RAID group.

This example presumes that there are at least four disk drives in the RAID group from which the RAID stripe 196(3) is formed. However, this is merely an example, as the same benefits can be obtained with RAID groups containing as few as two disk drives, e.g., where a first disk drive stores a primary copy of an inode and a second disk drive stores a secondary copy. Further, it should be understood that the terms "primary" and "secondary" may be arbitrary. For instance, in some examples, either copy may be regarded as an original. The example shown is thus intended merely to be illustrative.

Figure 5:
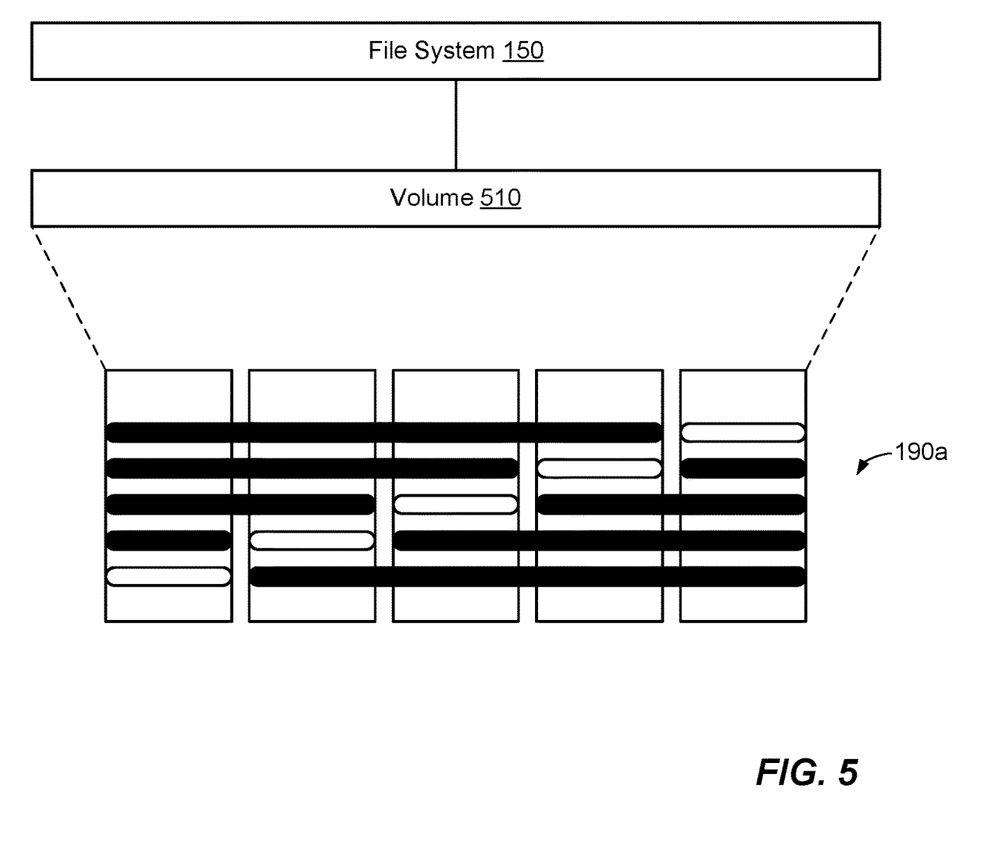
FIG. 5 is a block diagram showing one example arrangement of the file system of FIG. 1.

FIG. 5 shows an example arrangement of storage components on which the file system 150 may be constructed. Here, the file system 150 is built upon a volume 510, such as a sparse metavolume, and the volume 510 is built upon the RAID group 190a. For example, the RAID group 190a is rendered as multiple slices (e.g., 256 MB or 1 GB extents), which are provisioned from the RAID group 190a to the volume 510. In some examples, the volume 510 is built upon multiple RAID groups 190. The RAID groups, or any of them individually, may be arranged according to RAID 5 (i.e., single parity), according to RAID 6 (i.e., double parity), or in any other suitable RAID configuration, including those that provide stripes but no parity.

Figure 6:
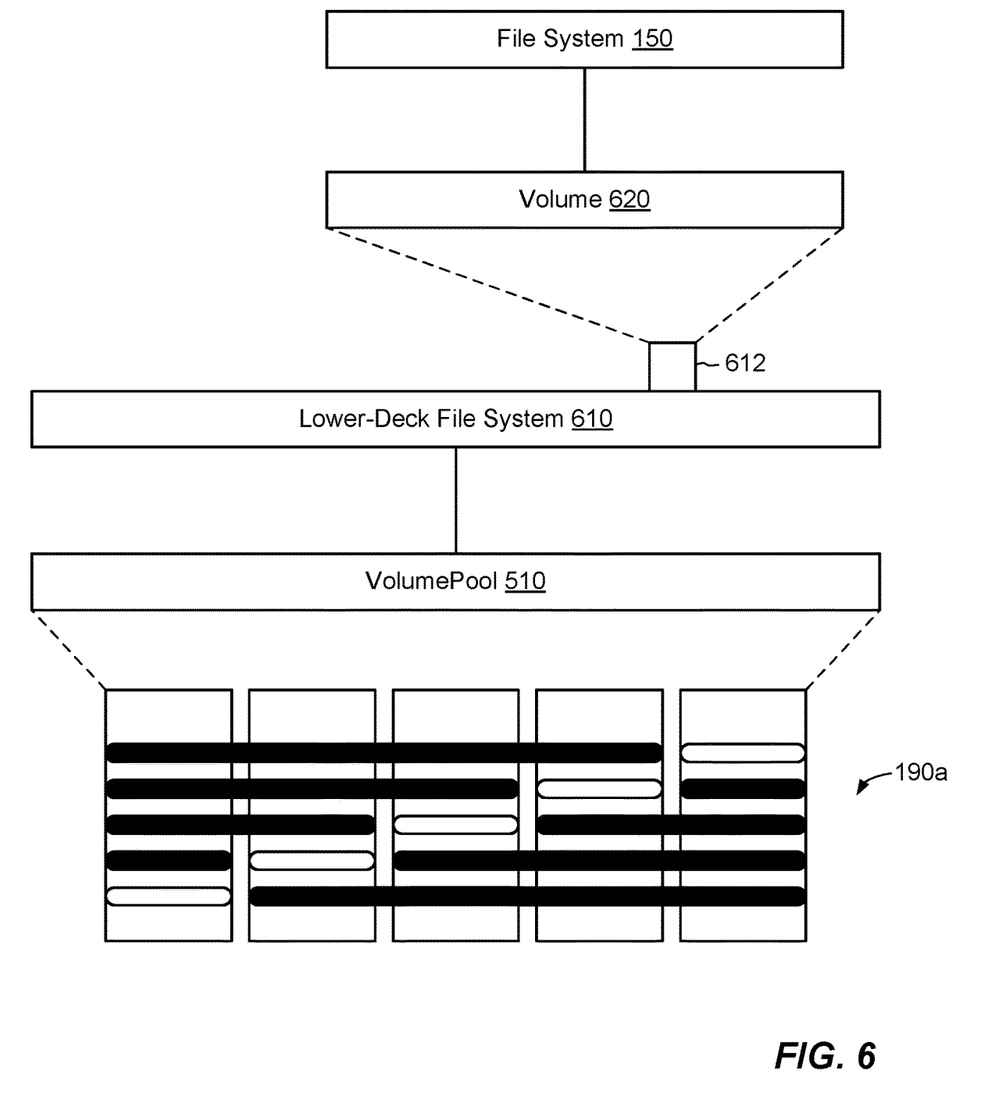
FIG. 6 is a block diagram showing another example arrangement of the file system of FIG. 1.

FIG. 6 shows another example arrangement of storage components on which the file system 150 may be constructed. In this example, the file system 150 is implemented as a so-called "upper-deck" file system, which is expressed from a file 612 of a so-called "lower-deck" file system 610. The lower-deck file system 610 is built upon a volume 510, which in turn is expressed from the RAID group 190a (or from multiple RAID groups), in a manner similar to that described in connection with FIG. 5.

In this implementation, however, the file 612 within the lower-deck file system 610 is expressed as a volume 620. For example, logical addresses of the file 612 are made to correspond to physical addresses of the volume 620. The file system 150, here implemented as an upper-deck file system, is built upon the volume 620.

Either or both file systems 150 and 610 may implement the above-described technique of coalescing multiple related metadata elements into sub-ranges. For example, the upper-deck file system 150 may include sub-ranges 154, with a file system manager in the upper-deck coalescing related metadata elements within the same sub-ranges. In some examples, sub-ranges in the upper-deck file system map to corresponding sub-ranges in the lower-deck file system 610. Such sub-ranges within the lower-deck file system 610 may be mapped to respective stripes in the RAID group 190a. Thus, coalescing related metadata in the upper deck promotes efficiency at the lower deck, with writes of sub-ranges in the lower-deck effecting stripe writes of metadata in the upper deck.

Figure 7:
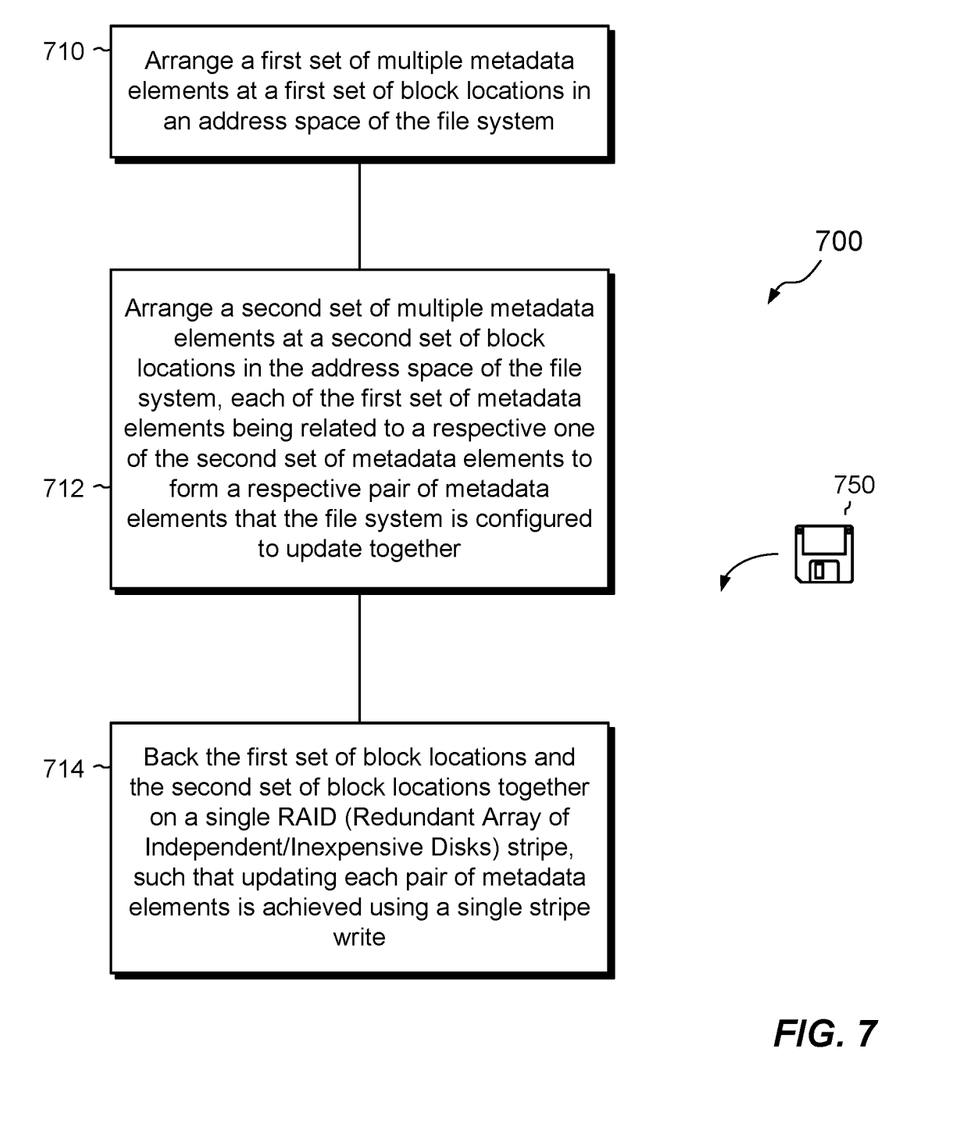
FIG. 7 is a flowchart showing an example method of managing a file system in a data storage system.

FIG. 7 shows an example process 700 for managing a file system in a data storage system. The process 700 may be performed in connection with the environment 100 and may be carried out by the software constructs, described in connection with FIG. 1, which reside in the memory 130 of the storage processor 120 and are run by the set of processing units 124. The various acts of the process 700 may be ordered in any suitable way. Accordingly, embodiments may be constructed in which acts are performed in orders different from those illustrated, which may include performing some acts simultaneously, even though the acts are shown as sequential in the illustrated embodiments.

At 710, a first set of multiple metadata elements is arranged at a first set of block locations in an address space of the file system. For example, IBs, VBM blocks, or inode blocks may be arranged at block locations within a particular sub-range 154 in the address space 152 of a file system 150 (FIG. 1). IBs may be arranged at block locations 230 in sub-range 154a (FIG. 2), VBM blocks may be arranged at block locations 330 in sub-range 154b (FIG. 3), and/or blocks storing primary inodes may be arranged at block locations 410a and/or 410c in sub-range 154c (FIG. 4).

At 712, a second set of multiple metadata elements is arranged at a second set of block locations in the address space of the file system, each of the first set of metadata elements being related to a respective one of the second set of metadata elements to form a respective pair of metadata elements that the file system is configured to update together. For example, BMD for the IBs in sub-range 154a may be arranged at block location 220 (FIG. 3), with each IB forming a pair with a respective element of BMD, such that, each time the file system 150 updates an IB at a block location 230, the file system computes a new CRC for that IB and stores it in the BMD for that IB at block location 220. As another example, BMD for the VBM blocks in sub-range 154b may be arranged at block location 320 (FIG. 3), with each VBM block at any of locations 330 forming a pair with a respective element of BMD at block location 320, such that, each time the file system 150 updates a VBM block at any block location 330, the file system computes a new CRC for that VBM block and stores it in the BMD for that VBM block at block location 320. To provide yet another example, secondary inodes may be arranged at locations 410b and 410d. The secondary inodes are duplicates of the primary inodes arranged at locations 410a and 410c and thus form respective pairs therewith. To maintain resiliency, the file system manager 150a is configured to update a secondary inode each time it updates a primary inode.

At 714, the first set of block locations and the second set of block locations are backed together on a single RAID stripe, such that updating each pair of metadata elements is achieved using a single stripe write. For example, co-locating an IB and BMD for that IB in sub-range 154a allows both metadata elements to be backed together on a single stripe 196(1) Likewise, co-locating a VBM and BMD for that VBM in sub-range 154b allows both metadata elements to be backed together on a single stripe 196(2). Further, co-locating a primary inode and a secondary inode, which is a duplicate of the primary inode, in sub-range 154c allows both metadata elements to be backed together on a single stripe 196(3).

By coalescing related metadata changes into a single RAID stripe, the improved technique reduces the number of parity operations that need to be performed. Reducing the numbers of parity operations reduces the number of disk accesses and allows disk resources to be used more productively. In addition, reducing the number of parity operations promotes more productive use of processing resources. The improved technique therefore improves the overall functioning of a data storage system.

Having described certain embodiments, numerous alternative embodiments or variations can be made. For example, although embodiments have been described in connection with IBs, VBMs, and inodes, this has been for illustration only, as the invention hereof may be applied to other types of file system metadata is not limited to any particular types of file system metadata.

Also, although certain RAID configurations have been specifically described, such as RAID 5 and RAID 6, the invention is not limited to these configurations but may be applied in any RAID arrangement that provides striping.

Further, although the examples above identify metadata blocks (e.g., IBs, VBM blocks, and inode blocks) as metadata elements, such metadata elements may alternatively have finer granularity. For example, individual block pointers, VBMs, and/or inodes may also be considered to be "metadata elements," as that term is used herein.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 750 in FIG. 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing a file system in a data storage system, the method comprising:
    arranging a first set of multiple metadata elements at a first set of block locations in an address space of the file system;
    arranging a second set of multiple metadata elements at a second set of block locations in the address space of the file system, each of the first set of metadata elements being related to a respective one of the second set of metadata elements to form a respective pair of metadata elements that the file system is configured to update together;
    backing the first set of block locations and the second set of block locations together on a single RAID (Redundant Array of Independent/Inexpensive Disks) stripe; and
    updating each pair of metadata elements using a single stripe write.

2. The method of claim 1, further comprising:
    receiving a request to update a first metadata element of the first set of metadata elements, the first metadata element forming a pair with a second metadata element of the second set of metadata elements;
    in response to receiving the request, (i) generating a new value for the first metadata element, (ii) generating a new value for the second metadata element, and (iii) performing a single stripe write to store the first metadata element and the second metadata element together in the RAID stripe.

3. The method of claim 2, wherein the address space of the file system includes a range of contiguous block locations, the range of contiguous block locations including multiple sub-ranges, each of the sub-ranges backed by a respective RAID stripe, such that the first set of block locations and the second set of block locations are arranged within one sub-range of the multiple sub-ranges.

4. The method of claim 3, wherein the address space of the file system includes multiple sub-spaces, each sub-space being dedicated to a particular type of metadata and encompassing at least one of the multiple sub-ranges.

5. The method of claim 4, wherein the multiple sub-spaces include a metadata sub-space dedicated to metadata blocks, and wherein a sub-range within the metadata sub-space includes (i) multiple metadata blocks and (ii) a set of BMD (per-block metadata) blocks that includes BMD of each of the multiple metadata blocks within that sub-range.

6. The method of claim 5, wherein the metadata sub-space is dedicated to IBs (indirect blocks), and wherein a sub-range within the metadata sub-space includes (i) multiple IBs and (ii) a set of BMD blocks that includes BMD of each of the multiple IBs in that sub-range.

7. The method of claim 5, wherein the metadata sub-space is dedicated to VBMs (virtual block maps), and wherein a sub-range within the metadata sub-space includes (i) multiple VBM blocks and (ii) a set of BMD blocks that includes BMD of each of the multiple VBM blocks in that sub-range.

8. The method of claim 5,
    wherein each RAID stripe is part of a RAID group formed from multiple storage devices,
    wherein the multiple sub-spaces include another metadata sub-space, the other metadata sub-space reserved for metadata blocks for which a primary copy and a secondary copy of those metadata blocks is provided, and
    wherein the method further comprises arranging the primary copy of a metadata block and the secondary copy of that metadata block together in one sub-range but at block locations within that sub-range that the data storage system backs using different storage devices of the RAID group.

9. The method of claim 8, wherein the other metadata space is dedicated to inodes, for which both a primary copy and a secondary copy of each inode are provided.

10. The method of claim 8, wherein the RAID group is organized according to one of RAID 5 and RAID 6.

11. The method of claim 10, wherein the file system is an upper-deck file system built upon a volume expressed from a file in a lower-deck file system, and wherein the lower-deck file system is built upon a volume expressed from the RAID group.

12. The method of claim 10, wherein the file system is built upon a volume expressed from the RAID group.

13. A data storage system, comprising control circuitry that includes a set of processing units coupled to memory, the control circuitry constructed and arranged to:
arrange a first set of multiple metadata elements at a first set of block locations in an address space of the file system;
arrange a second set of multiple metadata elements at a second set of block locations in the address space of the file system, each of the first set of metadata elements being related to a respective one of the second set of metadata elements to form a respective pair of metadata elements that the file system is configured to update together;
back the first set of block locations and the second set of block locations together on a single RAID (Redundant Array of Independent/Inexpensive Disks) stripe; and
update each pair of metadata elements using a single stripe write.

14. The data storage system of claim 13,
wherein the address space of the file system includes a range of contiguous block locations, the range of contiguous block locations including multiple sub-ranges, each of the sub-ranges backed by a respective RAID stripe, such that the first set of block locations and the second set of block locations are arranged within one sub-range of the multiple sub-ranges, and
wherein the address space of the file system includes multiple sub-spaces, each sub-space being dedicated to a particular type of metadata and encompassing at least one of the multiple sub-ranges.

15. The data storage system of claim 14, wherein the multiple sub-spaces include a metadata sub-space dedicated to metadata blocks, and wherein a sub-range within the metadata sub-space includes (i) multiple metadata blocks and (ii) a set of BMD (per-block metadata) blocks that includes BMD of each of the multiple metadata blocks within that sub-range.

16. The data storage system of claim 15,
wherein each RAID stripe is part of a RAID group formed from multiple storage devices,
wherein the multiple sub-spaces include another metadata sub-space, the other metadata sub-space reserved for metadata blocks for which a primary copy and a secondary copy of those metadata blocks is provided, and wherein the method further comprises arranging the primary copy of a metadata block and the secondary copy of that metadata block together in one sub-range but at block locations within that sub-range that the data storage system backs using different storage devices of the RAID group.

17. A computer program product including a set of non-transitory, computer-readable media having instructions which, when executed by control circuitry of a data storage system, cause the control circuitry to perform a method of managing a file system in a data storage system, the method comprising:
arranging a first set of multiple metadata elements at a first set of block locations in an address space of the file system;
arranging a second set of multiple metadata elements at a second set of block locations in the address space of the file system, each of the first set of metadata elements being related to a respective one of the second set of metadata elements to form a respective pair of metadata elements that the file system is configured to update together;
backing the first set of block locations and the second set of block locations together on a single RAID (Redundant Array of Independent/Inexpensive Disks) stripe; and
updating each pair of metadata elements using a single stripe write.

18. The computer program product of claim 17,
wherein the address space of the file system includes a range of contiguous block locations, the range of contiguous block locations including multiple sub-ranges, each of the sub-ranges backed by a respective RAID stripe, such that the first set of block locations and the second set of block locations are arranged within one sub-range of the multiple sub-ranges, and
wherein the address space of the file system includes multiple sub-spaces, each sub-space being dedicated to a particular type of metadata and encompassing at least one of the multiple sub-ranges.

19. The data storage system of claim 18, wherein the multiple sub-spaces include a metadata sub-space dedicated to metadata blocks, and wherein a sub-range within the metadata sub-space includes (i) multiple metadata blocks and (ii) a set of BMD (per-block metadata) blocks that includes BMD of each of the multiple metadata blocks within that sub-range.

20. The computer program product of claim 19,
wherein each RAID stripe is part of a RAID group formed from multiple storage devices,
wherein the multiple sub-spaces include another metadata sub-space, the other metadata sub-space reserved for metadata blocks for which a primary copy and a secondary copy of those metadata blocks is provided, and
wherein the method further comprises arranging the primary copy of a metadata block and the secondary copy of that metadata block together in one sub-range but at block locations within that sub-range that the data storage system backs using different storage devices of the RAID group.

* * * * *